(12) United States Patent
Sundar et al.

(10) Patent No.: US 7,314,899 B2
(45) Date of Patent: Jan. 1, 2008

(54) PROCESS FOR THE PREPARATION OF POLY (URETHANE-ACRYLIC) COPOLYMER DISPERSION FOR INDUSTRIAL APPLICATIONS

(75) Inventors: Saimani Sundar, Tamil Nadu (IN); Vijayalakshmi Narasimhan, Tamil Nadu (IN); Sanjeev Gupta, Tamil Nadu (IN); Rajaraman Ranganathan, Tamil Nadu (IN); Ganga Radhakrishnan, Tamil Nadu (IN)

(73) Assignee: Council of Scientific & Industrial Research, New Delhi (IN)

( * ) Notice: Subject to any disclaimer, the term of this patent is extended or adjusted under 35 U.S.C. 154(b) by 439 days.

(21) Appl. No.: 10/813,972

(22) Filed: Mar. 31, 2004

(65) Prior Publication Data

US 2006/0167177 A1    Jul. 27, 2006

(51) Int. Cl.
*C08G 18/08* (2006.01)
*C08F 283/04* (2006.01)

(52) U.S. Cl. ............... 524/591; 525/454; 525/455

(58) Field of Classification Search ........... 524/591; 525/454
See application file for complete search history.

(56) References Cited

U.S. PATENT DOCUMENTS

| | | | | |
|---|---|---|---|---|
| 2,965,615 A | * | 12/1960 | Tess | 525/123 |
| 3,419,510 A | * | 12/1968 | Hudak | 524/109 |
| 3,484,392 A | * | 12/1969 | Wluka | 521/88 |
| 3,499,852 A | * | 3/1970 | Krawczyk et al. | 528/45 |
| 3,513,118 A | * | 5/1970 | Ehrlich et al. | 428/424.4 |
| 3,595,838 A | * | 7/1971 | Toyonaka | 528/60 |
| 3,730,927 A | * | 5/1973 | Schloss | 524/591 |
| 3,822,238 A | * | 7/1974 | Blair et al. | 528/59 |
| 3,850,861 A | * | 11/1974 | Fabris et al. | 521/170 |
| 4,183,836 A | | 1/1980 | Wolf, Jr. | |
| 4,190,566 A | | 2/1980 | Noll et al. | |
| 4,404,320 A | * | 9/1983 | Goto et al. | 525/58 |
| 5,221,788 A | * | 6/1993 | Goto et al. | 528/85 |
| 5,866,047 A | * | 2/1999 | Nagino et al. | 264/1.27 |
| 6,239,209 B1 | * | 5/2001 | Yang et al. | 524/507 |
| 6,339,125 B1 | | 1/2002 | Bechara et al. | |
| 6,812,300 B2 | * | 11/2004 | Ohrbom et al. | 525/498 |

\* cited by examiner

*Primary Examiner*—Randy Gulakowski
*Assistant Examiner*—John J Figueroa
(74) *Attorney, Agent, or Firm*—RatnerPrestia

(57) ABSTRACT

This invention describes a process to synthesize water based coating composition having polyurethane and vinyl polymers in the same backbone, which can be used as topcoat in leather. Polyurethane having iniferter groups are synthesized which is then used to incorporate vinyl monomers. The ionic groups are incorporated into PU by selecting vinyl monomers having carboxyl group. The controlled addition of the vinyl monomers is successfully achieved. Finally, it is dispersed in water to obtain the PU dispersion. The suitability of the product for coating application is evaluated on leather. The coating meets desirable protective and aesthetic demands.

16 Claims, No Drawings

PROCESS FOR THE PREPARATION OF POLY (URETHANE-ACRYLIC) COPOLYMER DISPERSION FOR INDUSTRIAL APPLICATIONS

FIELD OF INVENTION

The present invention relates to a process for the preparation of poly (urethane-acrylic) copolymer dispersion for industrial applications. More particularly this invention relates to synthesis of a coating material, having both polyurethane and vinyl polymer in the same backbone, suitable for topcoat applications.

BACKGROUND AND PRIOR ART REFERENCES

Polyurethanes (PU) are made water dispersible by using external emulsifiers. But they suffer a few disadvantages, as they require strong shear forces to disperse the polymer which results in coarse particles and poor dispersion stability. A unique method of dispersing PU in aqueous media is by structural modification, i.e., modifying hydrophobic PU backbone with built-in hydrophilic segments. Introduction of hydrophilic segments into PU backbone is achieved by incorporating non-ionic polyether segments. Reference may be made to Noll, et. al (U.S. Pat. No. 4,190,566), who used Polyethylene glycol as the hydrophilic segment. The dispersions obtained using polyethylene glycol have poor storage stability and film properties. Hydrophilic segments can also be introduced by incorporating ionic groups which can be cationic, as reported by Bechara, et al, (U.S. Pat. No. 6,339,125) or anionic, as reported by Wolfe, Jr., et al, (U.S. Pat. No. 4,183,836). In these methods the ionic groups are chain extenders which are incorporated at the chain extension stage. Hence this restricts the choice of the monomers to diamino/dihydroxy compounds bearing potential ionic centers. Since acrylics are used in leather finishing acrylics bearing ionic group can also be introduced into PU chain to impart hydrophilicity. To effect this PU backbone should possess initiating groups. PU containing iniferter groups can be used to incorporate acrylics. Polyurethane dispersions s how good abrasion resistance, soil resistance, low temperature flexibility and have excellent gloss. Also, they have good film adhesion, hence find application in leather coating. But polyurethanes are generally expensive.

Acrylic resins which were introduced in the 20th century in leather finishing due to their better light fastness, film adhesion, flexibility, resistance to water spotting and wet and dry rub fastness, became commercially predominant in leather finishing. An important feature about acrylics is their ability to bind a large amount of pigments. Hence a lower quality hides can be converted into good leather by the application of several coats of high covering pigments. But the drawbacks of all acrylics are their poor scuff resistance, wet rub fastness and low toughness. Moreover their thermoplastic nature leads to print retention but imparts tack at high temperatures. Unmodified acrylics give gripping touch to leather.

Copolymers can be prepared by conventional free radical polymerizations. The vinyl terminated polyurethanes are decomposed in the presence of free radical initiator and acrylic monomers to obtain PU acrylic copolymers. The main drawback of free radical polymerization is the lack of control over polymer molecular weight, architecture and end groups.

In water borne coatings, there is a greater sense in controlling the macroscopic structure for improved film properties. Control of macromolecular structure of monomer assemblies can be effectively carried out by Controlled polymerization.

In controlled polymerization several living radical polymerization techniques are being explored and iniferter technique is one of them. The advantages of iniferter method is that it is cheaper than other living polymerization technique, it can be easily prepared, the polymerization takes place at ambient temperature and does not require stringent conditions. More over, the polymerization of the vinyl monomers can be carried out in aqueous medium and hence the use of organic solvents can be avoided to a large extent.

The iniferters can be thermally dissociated to form radicals, which lead to further polymerization of the vinyl monomers. After the consumption of all vinyl monomers the iniferter forms dormant species by recombination, which can again be reactivated by increasing temperature. Hence almost all the properties like, hydrophilicity, hydrophobicity, mechanical properties, strength etc. can be altered, by using suitable monomers not only during the synthesis but even after preparing the final polymer.

In any other coating system, the properties of the material cannot be altered after the completion of the synthesis, due to the absence of reactive groups. Hence the modification of final properties is difficult even if it is required.

OBJECTS OF INVENTION

The main object of the present invention is to provide a process for the preparation of poly(urethane-acrylic) copolymer dispersion for industrial applications which obviates the drawbacks detailed above.

Another object of the present invention is to synthesize self-dispersing water based polyurethane-polyvinyl block copolymer.

Yet another object of the present invention is to incorporate vinyl monomers as much as 40% to the polyurethane backbone and hence reducing the raw material cost and altering the properties of the PU in synergy with those of the vinyl polymers.

Still another object of the present invention is to tailor the properties like hydrophilicity, hydrophobicity, mechanical properties, and strength and by selecting suitable monomer combinations.

Yet another object of the present invention is to achieve control over the incorporation of the vinyl monomers.

SUMMARY OF INVENTION

The present invention relates to a process for the preparation of poly (urethane-acrylic) copolymer dispersion for industrial applications. More particularly this invention relates to synthesis of a coating material, having both polyurethane and vinyl polymer in the same backbone, suitable for topcoat applications. It has enormous potential application for coating flexible materials. The copolymer finds application as coating substrate in leather finishing. Polyurethanes and Acrylics are the two major classes of coating materials widely finding application as flexible coating. Both exhibit unique and excellent properties of their own. Polyurethane coatings are noted for their high performance and in general provide excellent chemical, solvent and abrasion resistance properties as well as outstanding hardness and toughness combined with low temperature flexibility. Conventionally these polyurethane coating formulations are diluted with organic solvent. Due to the rapidly developing environmental regulations controlling air, water, and land pollutions, coating industries have changed many of their manufacturing processes and coating formulations as a step towards minimizing the impact on the environment.

DETAILED DESCRIPTION OF INVENTION

Accordingly, the present invention provides a process for the preparation of poly(urethane-co-acrylics) copolymer dispersion for industrial applications, which comprises
i) treating a polyol, based on polyether, polyester and/or polycarbonate type having molecular weight in the range of 500-3000, having general formula $(OH-R-OH)_n$, where R represents an alkyl group and n is any integer between 4 and 10, with 150-200 mole % of isocyanate of (cyclo) aliphatic or aromatic type at a temperature in the range of 40-150° C. under nitrogen atmosphere for a period of not less than 2 hrs to obtain isocyanate terminated pre-polymer,
ii) adding 50-100 mole % based on isocyanate, of diol having essentially tetraphenylethane as one component and 0.1-0.3 mol % of catalyst based on NCO content, in organic solvent such as esters, ethers, keto esters, chlorinated hydrocarbons, aliphatic/alicyclic hydrocarbons, pyrrolidones, hydrogenated furans, to the isocyanate terminated pre-polymer, as formed in step (i), under agitation at a temperature not exceeding 35° C. for a period in the range of 15-30 hrs to obtain iniferter incorporated polyurethane,
iii) treating 25-400% w/w of acrylic monomer, characterized essentially by vinyl monomers containing carboxyl groups and sulfonic acid groups, with polyurethane containing iniferter groups, as formed in step (ii), for a period not less than 12 hrs at a temperature in the range of 50-80° C. to obtain urethane-co-acrylic polymer,
iv) adding 0.01-0.1 mole % of base to urethane-co-acrylic polymer, as formed in step (iii), under agitation at a temperature in the range of 30-80° C. for a period of not less than 1 hr and subsequent dispersion of the resulting slurry in 150-200% v/v of water to obtain the poly (urethane-co-acrylic) copolymer dispersion.

In an embodiment of the present invention the polyol used may be selected from Polyehylene glycol, polypropylene glycol, polyoxypropylene glycol, poly (tetramethylene oxide) glycol, polycaprolactone diol.

In another embodiment of the present invention, isocyanates used may be selected from hexamethylene diisocyanate, isophorone diisocyanate, p-phenylene diisocyanate, toluene diisocyanate, diphenylmethane diisocyanate.

In yet another embodiment of the present invention, the organic solvent used may be selected from dimethyl sulphoxide, dimethyl formamide, dimethyl acetamide, acetone, butan-2-one, carbon tetrachloride, n-methyl pyrrolidone.

In still another embodiment of the present invention, the catalyst used may be selected from triethylene diamine, piperazine, dibutyl tin dilaurate, stannous octoate, dioctyl tin dilaurate, diaza bicyclo octane.

In yet another embodiment of the present invention the iniferter used may be selected from tetraphenylethane diol, dithio carbamate.

In still another embodiment of the present invention, the acrylic monomer used may be selected from acrylic acid, methacrylic acid, methylene succinic acid, 4-styrene sulfonic acid.

In yet another embodiment of the present invention, the base used may be selected from primary, secondary, tertiary amines, and/or alkali metal hydroxides like triethyl amine, trimethyl amine, triisopropyl amine, N,N'-dimethyl aniline, N,N'-diethanol amine, NaOH, KOH either individually or in combination.

The process of the present invention is described below in detail.

Polyether, polyester and/or polycarbonate based polyol, having general formula $(OH-R-OH)_n$, where R represents an alkyl group and n is any integer between 4 and 10, is treated under nitrogen atmosphere with 150-200 mole % of isocyanate of (cyclo) aliphatic or aromatic type at a temperature in the range of 40-150° C., for a period of not less than 2 hrs to obtain isocyanate terminated pre-polymer. This is reacted with, 50-100 mole % based on isocyanate, of diol having tetraphenylethane groups essentially as one component taken in organic solvent and 0.1-0.3 mol % of catalyst based on NCO content were added, under agitation at a temperature not exceeding 35° C. for a period in the range of 15-30 hrs to obtain iniferter incorporated polyurethane. This is treated with 25-400% w/w of acrylic monomer characterized essentially by vinyl monomers containing carboxyl or sulfonic acid groups for a period not exceeding 14 hrs at a temperature in the range of 50-80° C. to obtain urethane-co-acrylic polymer. 0.01-0.1 mole %, of base is then added to the polymer under agitation at a temperature in the range of 30-80° C. for a period of not less than 1 hr to neutralize the carboxyl groups and the resulting slurry is dispersed in 150-200% v/v of water to obtain the poly (urethane-co-acrylics) copolymer dispersion.

The inventive step of the present invention lies in the incorporation of iniferter groups into the isocyanate terminated pre-polymer, thereby facilitating the introduction of acrylics in the polymer chain, whereby the living radical polymerisation ensures controlled addition of acrylics, unlike conventional radical polymerization, along with possibility to alter the dispersion properties at any time The following examples are given by way of illustration and therefore should not be construed to limit the scope of the present invention.

EXAMPLE 1

34.8 g of toluene diisocyanate was taken in a four-necked 2 liter flask equipped with a thermometer, inlet for nitrogen, a condenser and stirrer with half moon blade. To this, 100 g of poly (tetramethylene oxide) glycol was added dropwise and the temperature was raised to 70° C. with constant stirring. The reaction was carried out till NCO content was reduced to half the initial value, which was determined by standard dibutylamine back titration method. The reaction mixture was cooled to 30° C., and 36.6 g of TPED (tetraphenylethane diol) and 0.126 g of dibutyltin dilaurate, dissolved in 84 ml of butane-2-one were added dropwise with stirring and the reaction was carried out at 40° C. for 24 hours. To this, 68.57 g of acrylic acid was added and the polymerization carried out at 75° C. for 36 hours. Then 96.23 g of triethyl amine was added and reaction mixture stirred for 1 hour at 60° C. to neutralize the COOH groups. To this 540 ml of water was added at 40° C., with agitation to obtain the aqueous poly(urethane-co-acrylics) copolymer dispersion. The dispersion was found to exhibit solid content of 35%, viscosity 3.9 Pa.s and pH 7.5.

This dispersion was applied as top coat on cow softy upper leather having conventional base coat. The coated leather was conventionally dried and subjected to physical testing. The test results are given in Table 1.

TABLE 1

Test results for coated leather

| Tests | Test method | Sample | Standard |
|---|---|---|---|
| Flexing Endurance | SLP 14 | >1,00,000 (dry) >50,000 (wet) | >1,00,000 (dry) >50,000 (wet) |
| Rub fastness | IUF 450 | 4 (dry) 3 (wet) | 3 (dry) 3 (wet) |
| Cold crack resistance | BS 6453 | With stand −15° C. | With stand −5° C. |
| Abrasion resistance | EN 344:1992 (5.14) | Slight abrasion | Not worse than moderate abrasion |
| Film adhesion strength | ISO 11644:1993 | 7.2 N/cm | Min. 3 N/cm |
| Heat resistance | SLF 20 | No disturbance/ delamination of film | No disturbance/ delamination of film |
| Water spot resistance | BS 1006 E07 | No permanent mark/stain | No permanent mark/stain |

Thus the dispersion was found to be suitable for top coat application.

EXAMPLE 2

33.64 gms of hexamethylene diisocyante was taken in a four-necked 2 litre flask equipped with a thermometer, inlet for nitrogen, a condenser and stirrer with half-moon blade. To this, 125 g of polycaprolactone diol was added dropwise and the temperature was raised to 75° C. with constant stirring. The reaction is carried out till NCO content is reduced to half the initial value, which was determined by standard dibutylamine back titration method. The reaction mixture was cooled to room temperature and to this 36.6 g of TPED and 0.126 g. of dibutyltin dilaurate dissolved in butan-2-one and were added dropwise with stirring and the reaction was carried out at 40° C. for 24 hours. To this, 84.6 g of methacrylic acid was added and the polymerization carried out at 80° C. for 24 hours. Then 90.8 g of triethylamine was added and reaction mixture stirred for 1 hour at 60° C. to neutralize the COOH groups. To this 604 g of water was added at 40° C., with agitation to obtain the aqueous dispersion. The dispersion was found to exhibit solid content of 35%, viscosity 3.3 Pa.s and pH 7.2, average particle size less than 2 μm. It was stored in a plastic container.

EXAMPLE 3

34.8 g of toluene diisocyanate was taken in a four-necked 2 liter flask equipped with a thermometer, inlet for nitrogen, a condenser and stirrer with half moon blade. To this, 100 g of polyoxypropylene glycol was added dropwise and the temperature was raised to 70° C. with constant stirring. The reaction was carried out till NCO content was reduced to half the initial value, which was determined by standard dibutylamine back titration method. The reaction mixture was cooled to 30° C., and 36.6 g of TPED (tetraphenylethane diol) and 0.126 g of dibutyltin dilaurate dissolved in 84 ml of n-methyl pyrrolidone were added dropwise with stirring and the reaction was carried out at 40° C. for 24 hours. To this, 51.55 g of Sodium 4-styrene sulfonic acid was added and the polymerization was carried out at 80° C. for 48 hours.

To this 436.2 ml of water was added at 40° C., with agitation to obtain the aqueous poly(urethane-co-acrylics) copolymer dispersion. The dispersion was found to exhibit solid content of 30%, viscosity 3.0 Pa.s and pH 6.7.

EXAMPLE 4

50.05 g of diphenyl methane diisocyanate was taken in a four-necked 2 liter flask equipped with a thermometer, inlet for nitrogen, a condenser and stirrer with half moon blade. To this, 60 g of polytetramethylene adipate was added dropwise and the temperature was raised to 80° C. with constant stirring for 2 hours. To this, 40 gms of polyethylene oxide glycol was added and the reaction was carried out till NCO content was reduced to half the initial value, which was determined by standard dibutylamine back titration method. The reaction mixture was cooled to 30° C., and 36.6 g of TPED (tetraphenylethane diol) and 0.126 g of dibutyltin dilaurate, dissolved in 84 ml of Butane-2-one were added dropwise with stirring and the reaction was carried out at 35° C. for 24 hours. To this, 56 g of methylene succinic acid was added and the polymerization was carried out at 75° C. for 24 hours. Then 55 gms of triethyl amine was added and the reaction mixture was stirred for one hour at 60° C. to neutralize carboxyl groups.

To this 468.77 ml of water was added at 40° C., with agitation to obtain the aqueous poly(urethane-co-acrylics) copolymer dispersion. The dispersion was found to exhibit solid content of 35%, viscosity 3.1 Pa.s and pH 6.9.

The main advantages of the present invention are the following.

1. The acrylic incorporation is effected by living polymerisation and hence the properties of the dispersions can be tailor made.
2. Because of the living character of the incorporated iniferter further polymerisation of the final product with vinyl monomers is possible which does not require stringent conditions.
3. By varying the vinyl monomers and the composition of the polyurethane backbone polymers with a wide range of properties can be easily synthesized.
4. The ionic groups essential for self-dispersion can be selected from the conventional dihydroxy/diamino compounds and also from vinyl monomers having potential ionic centers.
5. This is a new coating material having both polyurethane and acrylic on the same back bone, has the synergic properties of the polyurethane and the acrylic and the process is economical.
6. The present invention serves to provide a protective coating that is aesthetically pleasing

We claim:

1. A process for preparation of a dispersion of a self dispersing, synergistic poly(urethane-co-acrylic) copolymer useful as coating material, said process comprising the steps of:
   a. treating a polyol, having molecular weight in the range of 500-3000, with 150-200 mole % of a (cyclo)aliphatic or aromatic isocyanate at a temperature in the range of 40-150° C. under a nitrogen atmosphere, for a period of minimum 2 hours to obtain an isocyanate terminated pre-polymer;
   b. adding 50-100 mole %, based on the (cyclo)aliphatic or aromatic isocyanate, of an iniferter and 0.1-0.3 mol % of catalyst to the isocyanate terminated pre-polymer, in an organic solvent, under agitation at a temperature not exceeding 40° C. for a period in the range of 15-30 hrs to obtain an iniferter incorporated polyurethane;

c. treating 25-400% w/w of a vinyl monomer selected from the group consisting of vinyl monomers containing carboxyl groups or sulfonic acid groups, with the iniferter incorporated polyurethane for a minimum of 12 hours at a temperature in the range of 50-80° C. to obtain a urethane-co-acrylic polymer;

d. adding 0.01-0.1 mole % of base to the urethane-co-acrylic polymer, formed in step (c), under agitation at a temperature in the range of 30-80° C. for a period of minimum 1 hour to obtain a slurry, and e. dispersing the slurry in 150-200% v/v of water to obtain the dispersion of the poly(urethane-co-acrylic) copolymer.

2. A process as claimed in claim 1, wherein the polyol is selected from the group consisting of polyethylene glycol, polypropylene glycol, polyoxypropylene glycol, poly (tetramethylene oxide) glycol, and polycaprolactone diol.

3. A process as claimed in claim 1, wherein the (cyclo) aliphatic or aromatic isocyanate is selected from the group consisting of hexamethylene diisocyanate, isophorone diisocyanate, p-phenylene diisocyanate, toluene diisocyanate, and diphenylmethane diisocyanate.

4. A process as claimed in claim 1, wherein the organic solvent is selected from the group consisting of dimethyl sulphoxide, dimethyl formamide, dimethyl acetamide, acetone, butan-2-one, carbon tetrachloride, and N-methyl pyrrolidone.

5. A process as claimed in claim 1, wherein the catalyst is selected from the group consisting of triethylene diamine, piperazine, dibutyl tin dilaurate, stannous octoate, dioctyl tin dilaurate, and diaza bicyclo octane.

6. A process as claimed in claim 1, wherein the iniferter is selected from the group consisting of tetraphenylethane diol and dithio carbamate.

7. A process as claimed in claim 1, wherein the vinyl monomer is selected from the group consisting of acrylic acid, methacrylic acid, methylene succinic acid, and 4-styrene sulfonic acid.

8. A process as claimed in claim 1, wherein the base is selected from the group consisting of primary amines, secondary amines, tertiary amines, alkali metal hydroxide, and combinations thereof.

9. A process as claimed in claim 1, wherein the synergistic poly(urethane-co-acrylic) copolymer has cold crack resistance up to −15° C.

10. A process as claimed in claim 1, wherein the synergistic poly(urethane-co-acrvlic) copolymer has film adhesion strength about 7.2 N/cm.

11. A process as claimed in claim 1, wherein the synergistic poly(urethane-co-acrvlic) copolymer has rub fastness up to 4 dry.

12. A process as claimed in claim 8, wherein the base is selected from the group consisting of triethyl amine, trimethyl amine, triisopropyl amine, N,N'-dimethyl aniline, N,N'-diethanol amine, NaOH, KOH, and combinations thereof.

13. A process as claimed in claim 1, wherein the iniferter is tetraphenylethane diol.

14. A process as claimed in claim 13, wherein the polyol is selected from the group consisting of polyethylene glycol, polypropylene glycol, polyoxypropylene glycol, poly (tetramethylene oxide) glycol, and polycaprolactone diol.

15. A process as claimed in claim 14, wherein the poly (urethane-co-acrylic) copolymer has cold crack resistance up to −15° C., a film adhesion strength about 7.2 N/cm, and a rub fastness up to 4 dry.

16. A process as claimed in claim 15, wherein the vinyl monomer is selected from the group consisting of acrylic acid, methacrylic acid, methylene succinic acid, and 4-styrene sulfonic acid.

* * * * *